Jan. 30, 1962 J. J. SEIDMAN ET AL 3,019,344
OPTICAL DEVICE AND SYSTEM
Filed July 23, 1958 2 Sheets-Sheet 1
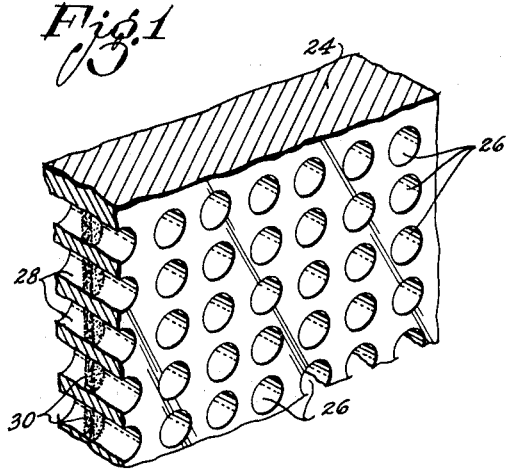
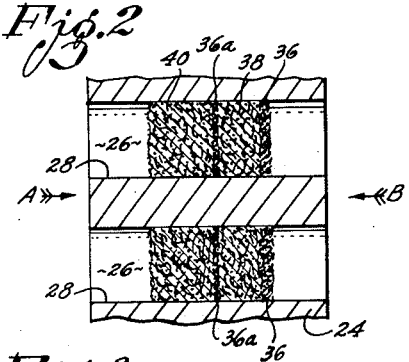
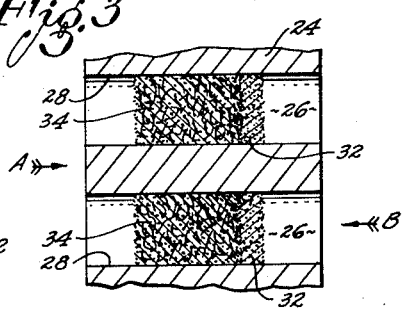
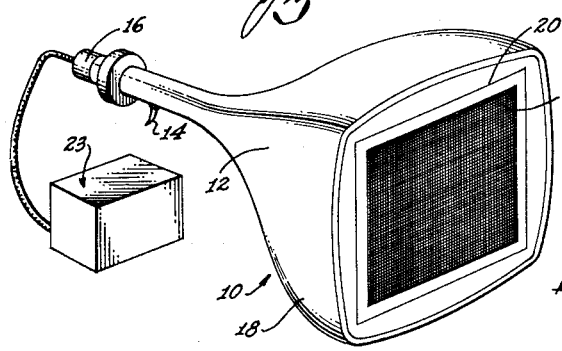
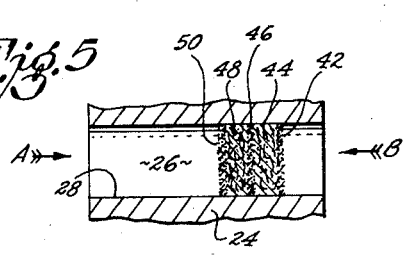
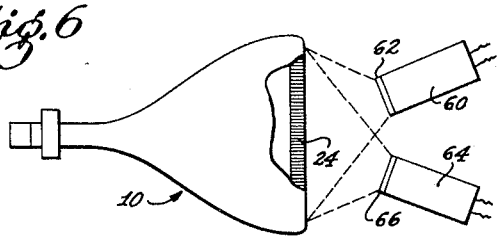
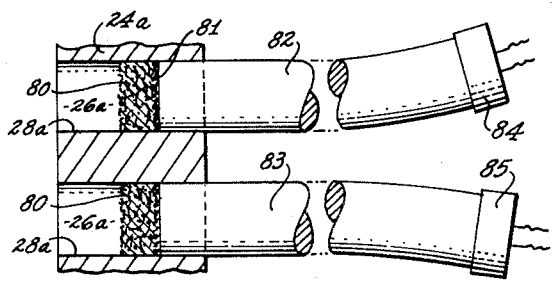
INVENTORS
Jay J. Seidman
James R. Cornell
Louis A. Kline
By John J. Matlago
Their Attorneys Jan. 30, 1962 J. J. SEIDMAN ET AL 3,019,344
OPTICAL DEVICE AND SYSTEM
Filed July 23, 1958 2 Sheets-Sheet 2
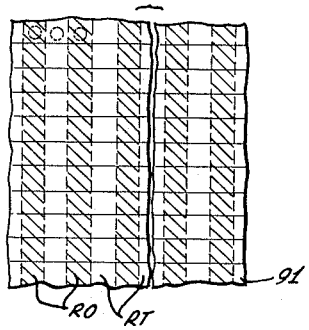
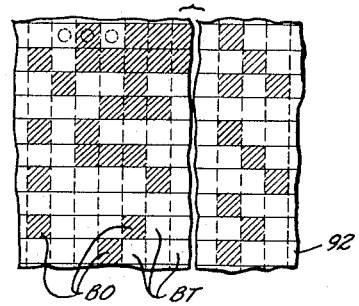
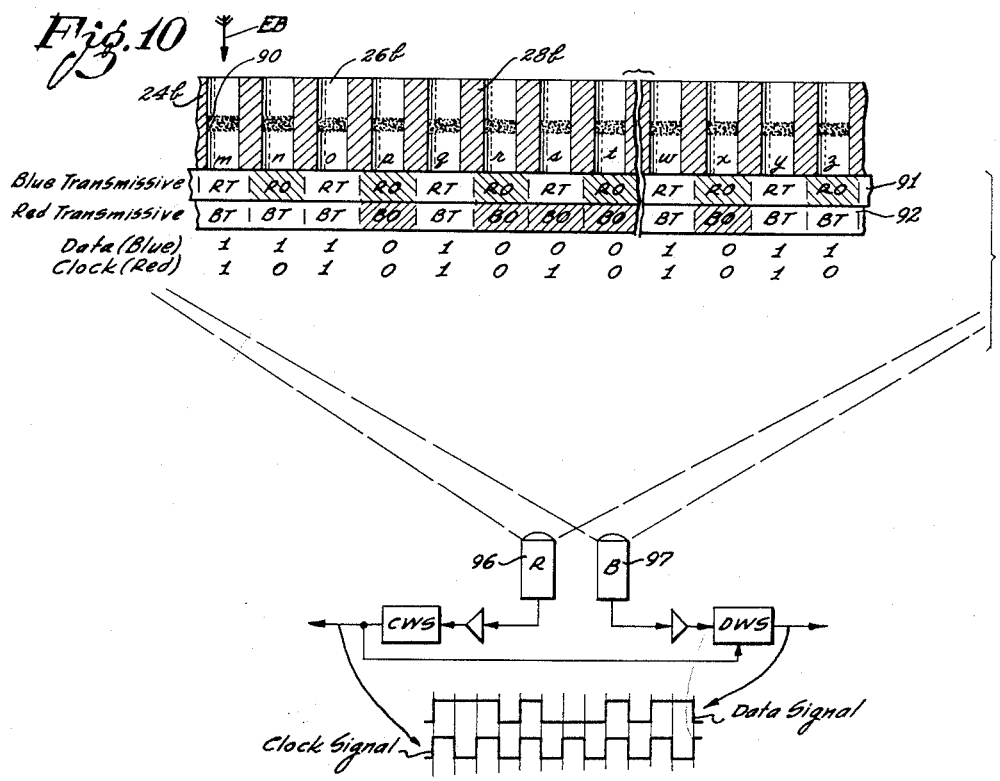
INVENTORS
Jay J. Seidman
James R. Cornell
By Louis A. Kline
John J. Matlago
Their Attorneys

United States Patent Office 3,019,344
Patented Jan. 30, 1962

3,019,344
OPTICAL DEVICE AND SYSTEM
Jay J. Seidman, Los Angeles, and James R. Cornell, Alondra, Calif., assignors to The National Cash Register Company, Dayton, Ohio, a corporation of Maryland
Filed July 23, 1958, Ser. No. 750,413
10 Claims. (Cl. 250—208)

This invention relates to devices having utility in digital-data processing systems as an information-storage adjunct, and having other fields of utility. More particularly, the invention relates to means for providing a multiplicity of closely-disposed discrete optical units or systems. A basic part of the invention comprises means providing individual discrete optical paths or passages each of very small cross-section and physically separated from one or more like paths or passages by means which form a strong, rigid, mechanical structure.

In the description and claims of this specification special meanings are attached to such terms as luminophor, fluorophor, phosphor, luminescence, and derivatives thereof; and the meanings thus attached are those generally understood in the solid-state physics art and exemplified by definitions set out in the text "Luminescence of Solids," Leverenz (John Wiley and Sons Co.), and especially on pages 146–152 of that text. The term photo-metachromic is employed to designate those metachromic materials susceptible to metachromism as a result of irradiation by light, the latter being considered to include infrared and ultraviolet emissions as well as the visible portions of the electromagnetic wave spectrum. The term "optical" as applied to means is intended to include such means as may be usable with the infrared, visible, and ultraviolet portions of the spectrum.

In the field of digital computers there is need for a data-storage means capable of registering or temporarily storing an information bit in a very small period of time and capable of permitting rapid access to stored information; and capable as well of storing a large number of information bits in a very small space. In other words, there is need for a high-speed, high-density data-storage means. The present invention comprehends provision of means anticipating this and other needs, without utilization of moving parts such as magnetic drums, by providing a multiplicity of densely packed discrete optical units each of which includes an individual boundary-restricted light-path in which data-storing material may be disposed. The light-path of any of the units is defined and bounded by a respective wall or set of walls, the wall being that of a hole of very small cross-section and extending straight through a plate-like solid. Preferably the optical units are holes or passageways such as through-bores of right-circular cross-section of very small diametral dimension; for example, one mil in diameter. The provision of very closely packed minute discrete light-paths permits either of alternative solutions to the problem of providing a compact optical memory system.

In a first solution of the mentioned problem, there is placed in each of discrete light paths a respective mass or deposit of luminophor material such as one or more suitable phosphors, adjacent to which are disposed respective masses of a suitable photo-metachromic material, whereby upon stimulation of the luminophor material by an activating radiation, the photo-metachromic material is optically altered by a first color of radiation from the luminophor, and thereby a bit of information is therein stored. The information bit thus stored may be extracted or "read out" by reversing the optical change of the photo-metachromic material by irradiating the material with a second wavelength of radiation produced by the luminophor when the latter is, for example, "quenched" or excited by a different stimulating effect. Stimulation of the luminophor material may be by irradiation by beams of electrons of two different levels of energy or potential; or alternatively, by other types of radiation, depending upon the materials used. Detection of the color-state of the photo-metachromic material may be effected by photo-sensitive means of known types. For example, detection of color-change of the photo-metachromic material, which is a change in its absorption characteristics, may be detected by operation of one or another of two photo-multiplier tubes both of which are positioned to receive light from the photo-metachromic material by way of a respectively different optical filter.

In the second alternative construction of a compact optical data-storage means, each respective optical passageway may have therein a mass of luminophor of bi-stable characteristics. For example, a phosphor susceptible of stimulation to one of distinct bistable states, and susceptible of quenching to the second bistable state with concurrent emission of light, may be deposited in the passageway. In this instance, the emission may occur both upon the phosphor being stimulated and at quenching, or only at the time of quenching. The two different states of the phophor may, for example, be produced by bombarding (impinging) the phosphor with respectively different electron-beams of different energy levels.

In the field of optical study of phosphors and other luminophors, and especially in the study of those luminophors which are adversely affected or which decompose when placed under very low pressures such as are encountered in cathode-ray tubes, there is a distinct need for a means which will permit activation or stimulation of the luminophor by an emission which is grossly absorbed by air or gases. Examples of such emissions are found in portions of the ultraviolet portion of the spectrum. The present invention provides a tool or device permitting such studies to be pursued. In a typical example, a plate-like structure, providing a multiplicity of the aforementioned optical paths, is used as a face-plate for a cathode-ray tube. In each hole or passageway in the plate, a mass of electron-activatable luminophor not susceptible to vacuum-degradation is situated for electron bombardment, and a very thin emission-transmitting seal deposited over the outside of the luminophor. The luminophor is selected to provide the particular wavelength of emission desired in the study. Next adjacent the seals in the respective holes are placed small masses of the material to be studied and which is to be subjected to the emission from the inner luminophor. Since this material (which may be a phosphor or a fluorophor, for example) is next adjacent to the thin seal, it may receive the emission from the luminophor without the emission being required to proceed through any appreciable extent of air. The seal may, of course, be formed of a material which passes the exciting emission of the luminophor without appreciable attenuation.

Exemplary constructions and materials illustrating this aspect of the invention will be described in the following parts of this specification.

In the field of high-density data-storage systems it is desirable to have a means permitting self-clocking of the information read-out; and the invention in one form is exceptionally well suited to provide a self-clocking system. Details of such system are hereinafter explained.

It is, then, a principal object of the invention to provide a device presenting a multiplicity of closely-adjacent discrete optical units. An additional object of the invention is to provide an improved optical memory device, useful in digital computers or data-processors. Another object is to provide means permitting production of luminescence radiation over a large-area screen or the like with much lower absorption-loss than is usual in, for example, cathode-ray tubes and kinescopes. Another object of the invention is to provide a large-capacity static data-storage system occupying a relatively small space. Another object of the invention is to provide a photo-metachromic data-storage device. Another object of the invention is to provide means for translating a signal represented by a modulated beam of electrons into stored signals susceptible of optical or other type of detection. Another object of the invention is to provide means permitting production of discrete beams of luminescence radiation below the wavelengths at which such radiation would otherwise be absorbed by, or greatly scattered by, a glass envelope or window of conventional character. Another object is to provide a novel "fiber optics" system. Another object of the invention is to provide a high-density data-storage system having a self-clocking characteristic. Other objects and advantages of the invention will hereinafter be made apparent or become apparent in connection with the following description and the appended claims. In the drawings forming a part of the specification:

FIG. 1 is a somewhat diagrammatic view of part of an exemplary plate-like member comprising a plurality of one form of optical units according to the invention, portions of the member having been broken away and the remainder of the structure shown magnified;

FIG. 2 is a view in section of a portion of the member shown in FIG. 1, illustrating details of a pair of individual optical units;

FIG. 3 is a view in section, similar to FIG. 2, depicting details of a plurality of optical units each comprising cascaded luminophors;

FIG. 4 is a pictorial representation of a cathode-ray tube device modified to include face-plate means according to the invention, with auxiliary circuitry shown schematically;

FIG. 5 is a sectional view similar to FIG. 3 but showing a single optical unit of modified construction for special purposes;

FIG. 6 is a diagrammatic representation of an arrangement of apparatus for use in determination of results obtainable by employment of means illustrated in other figures of the drawings;

FIG. 7 is a view in section illustrating a typical application of the invention in the field of fiber optics;

FIG. 8 is a diagram illustrating in magnified form a fragment of a color-transparency film useful as an optical filter forming a portion of a high-density data-storage means;

FIG. 9 is a diagram similar to FIG. 8 illustrating part of a color-transparency film useful as a data-storage means; and FIG. 10 is a diagram illustrating a self-clocking high-density data-storage system according to the principles of the invention.

In the exemplary and preferred physical apparatus selected to illustrate certain applications of the invention, well-known circuitry and operational details relating to cathode-ray tubes and electron beams or streams are not illustrated in particular detail nor extensively described. It is taken for granted that means for supplying a controllable and modulated finely-focused stream of electrons in an evacuable envelope are well known and understood. The exemplary cathode-ray producing apparatus mentioned utilizes well-known means and the known operational techniques thereto relating, as understood and practiced in the television and cathode-ray oscilloscope arts. Further information in respect to those known auxiliary means and techniques may be obtained from such well-known texts as "Modern Oscilloscopes and Their Uses," by Ruiter (Murray Hill Books, Inc., New York City); "The Oscilloscope at Work," by Hoas et al. (Iliffe & Sons, Ltd., London); and "Encyclopedia on Cathode-Ray Oscilloscopes and Their Uses," by John H. Rider and Seymour D. Uslan (John F. Rider Publications, New York City, N.Y.).

In FIG. 4 an exemplary suitable means for controllably supplying a finely focused cathode-ray beam or stream of electrons is diagrammatically illustrated in the form of a cathode-ray tube (CRT) 10, modified in a manner hereinafter explained. The CRT 10 comprises an evacuable or evacuated envelope 12 which may in instances be provided with means including an evacuation tube 14, and which CRT is provided with a conventional "gun" (not shown in detail) and other means for producing, modulating, focusing, and controlling a stream of electrons. The face end of the CRT is unlike that of an ordinary oscilloscope in that it is not provided with a conventional phosphor coating on the inside surface, but has incorporated therein or applied thereto, a special device or apparatus which for convenience will herein be termed a "face-plate." As depicted, CRT 10 is formed with a generally cylindrical end portion 16 merging with the small end of a tapered body portion 18 which in turn merges with or is attached in gas-tight relationship to a face-end portion 20. Occupying a desired areal extent of the face end of envelope 12 is a face-plate 22 which per se forms an important device constructed in accord with the invention. The face-plate may be of either of several specific constructions depending upon environmental conditions of use. Suitable conventional power and control means are collectively depicted in diagram form as a means 23.

A magnified section or fragment of a face-plate device constructed according to the invention is depicted in FIG. 1. The principal or body portion of this exemplary face-plate is comprised essentially of a rigid plate or slab of glass or the like; for example, the plate may be of methyl methacrylate or other organic polymerization product. The plate preferably is made opaque for a reason presently made obvious, and is provided with a multiplicity of closely-spaced holes or passages 26 therethrough from face to face. In certain cases it is desirable that the holes be arranged in a definite geometric array or pattern, as is indicated in FIG. 1 wherein the holes are shown arranged in rows and columns. In other cases it is desirable that the holes (optical passages) be disposed in an irregular positional arrangement. For the sake of conciseness, only one arrangement is described. The holes or passageways 26 are preferably all as nearly alike as it is practicable to form or produce them, are formed preferably of right-circular cross-section and of uniform diameter throughout, and are as smooth-walled as it is possible to make them. The latter feature is, as hereinafter made evident, desirable from the standpoint of low light-adsorption and maximum light-transmission. Since it is desirable that transmittance of radiation through the respective optical passages (and through any optical and mechanical objects interposed in the passages) be as efficient as possible, and since it is desirable that each passageway serve as a discrete optical unit independently of all the others, it is desirable that the material of which the plate is formed be opaque to the radiations involved in the use of the device. By this expedient interference or "cross talk" between adjacent optical units is minimized.

Since plate 24 is in a majority of its intended and contemplated applications used as a portion of the envelope of an evacuable vessel, it is in such cases essential that each of the optical passages or units include as an element thereof, a seal or like means for prohibiting passage of gas through the unit. In some cases this seal may be formed by an optically-active material, such as a luminophor, deposited in a fused form in the passageway. In other instances the seal may be in the form of a self-sufficient relatively rigid means such as a thin "window pane" of suitable material such as silica glass, firmly secured to or fused with the wall of the passageway. In other instances a principal part of the mechanical strength required to prohibit flow of gas through the passageway may be provided by more or less porous material such as a phosphor, a thin film of sealant being supported or "backed up" by the porous body; and in this latter type of construction the seal may be formed of less rigid material such as glyptal resin or Canada balsam. To minimize optical scattering effects the seals may be situated well into the interiors of the respective passageways, but in some applications it may be desirable to position the seals substantially flush with one face of the plate. These and other details will hereinafter be more fully explained.

Referring to FIG. 1, each passageway 26 is defined by a smooth bounding surface or interior wall 28. Each passage forms an essential, although non-material, component of a respective optical unit. As will hereinafter be made more fully evident, the very fact that the passageway is per se only absence of material, i.e., intangible, is a very important feature of the invention. As indicated, the passages are substantially perpendicular to the opposite faces of plate 24, although this feature is in some cases not essential. Various procedures may be employed in producing the holes through plate 24, and in some instances the procedures may be modified, in dependence upon the material of which the plate is made. In a typical exemplary procedure, a matrix of fine parallelly disposed filaments is positioned for reception of fluid material (molten glass, polymerizable monomer, etc.), and the latter forced into the interstices of the filaments and into contact therewith while the latter are tensioned. After solidification and possible annealing, the filaments are removed. This may be effected, in the case of wire monofils in glass, by electrolysis, the wires being used as cathode material. In the case of organic polymer monofils (and of metallic wire as well) solvents or etchants may be employed to remove the filamentary material and leave optically acceptable holes or passages. As an example, cellulose acetate monofils may be given a coating of methyl methacrylate monomer, arranged in a suitable matrix and embedded in methyl methacrylate monomer and the latter polymerized to solid state by exposure to heat and light. Thereafter the monofils are cut off at one face of the solid and are subjected at their other ends to tension, whereby they are individually stretched and reduced in diameter sufficiently to be drawn out of the respective parts of the encircling solid and leave open passages through the latter. The solid may, if necessary, be then sawed or surfaced to the proper thickness and shape. In similar fashion, methyl methacrylate monofils may be embedded in an opaque epoxy resin and the latter solidified. The resulting product provides a multiplicity of discrete optical "fibers" or filaments as "fiber optics" units.

Following production of the plate-like member with a multiplicity of discrete or separate optical passages or holes, appropriate optical elements are placed or deposited in the respective holes to render the optical passages proof against passage of gas. The simplest optical element is merely a radiation-transmissive gas-tight barrier or seal, such as is indicated (with a portion removed) at 30 in FIG. 1. This seal may be of the type hereinbefore described, and may be situated either as depicted, in the interior of an optical passage, or at one or both faces of the plate 24. In the latter case, of course, a double seal is provided. The seal is effective to withstand the pressure differential to which the opposite faces of the plate may be subjected, which in the case of a face plate for a CRT is substantially atmospheric pressure. Accordingly, the thickness of the seal is related to the diameter of the hole or passage, to the strength of the seal material, and to the nature of the support or backing afforded by any other optical element; and the thickness is regulated accordingly but preferably is as thin as is practicable so as to reduce transmission losses in the emission passing therethrough.

Additional optical elements may be deposited in the respective passages or holes of a plate 24. For example, and as illustrated in FIG. 3, masses or bodies 34 of a luminophor are deposited in the respective passageways as components of the respective optical units. The luminophor, which may be a suitable phosphor, is situated in the units in contact with and in pressure-resisting aiding relationship with the gas-tight seals 32. As is evident, activating radiation for the luminophor 34 may enter the respective units from either of opposite directions indicated by arrows A and B in the figure. Activating or stimulating radiation (light, infrared, ultraviolet, cathode rays, etc.) entering in the direction indicated by arrow A, will impinge directly upon the luminophor 34, and resultant emission will be transmitted through seals 32. Alternatively, the exciting radiation may enter the units in the direction of arrow B, be transmitted through thin seals 32 and impinge upon and stimulate (and/or quench) luminophor 34. For example, and considering the plate (24) to be mounted in the path of a beam of radiation of a selected frequency, the radiation may enter one or more of the optical units in the direction of arrow A and impinge upon and thereby stimulate the luminophor 34. The latter may, for example, be either of phosphors CE6191 and L-302A1, both marketed by U. S. Radium Corporation. Stimulation of the luminophor 34 in a specific one of the optical units (or in a specific group thereof) stores therein a binary information bit, which in this case may be considered to be a binary "one." Accordingly, non-stimulation, i.e., lack of stimulation, of the phosphor may be considered to be equivalent to storage of a binary "zero." Subsequent to the storage of binary information in the appropriate individual optical units, the information may be "accessed" and read out, by selective direction of a beam of quenching radiation at the particular unit whose stored information is desired. Incident to quenching, the luminophor becomes luminescent, and the emission is detected by photodetector means such as a photomultiplier tube means 60 (FIG. 6). Since the units are, either individually or by groups, arranged in a predetermined order or matrix, operations such as "reading" and "writing" of information bits are effected in serial manner by a beam of radiation which is time-correlated with signal output of the photodetector. The "writing" or storing of information, may be by stimulation of a phosphor; and "reading" or extracting stored information may be by phosphor-quenching. Stimulation of the specific exemplary phosphor mentioned may be by infrared radiation, and quenching by visible radiation in the range from 5600 angstroms to 7000 angstroms. In general, many known phosphors have deep electron traps, and those of that group which it is possible to pre-excite (as by strong CR heating) and then stimulate and quench (usually by emissions having energies lower than the energies of the emitted luminescence photons) are suitable for use. Selection of a phosphor in a specific application of the invention is also influenced by the expected ambient temperature at which operation is to be effected. In general, the lower the operating temperature, the wider the field from which a phosphor may be selected; and conversely.

In FIG. 2 there is illustrated an application of the invention in the field of photo-metachromic memory devices for digital computers. In that figure, 24 designates a plate-like element of the characteristics hereinbefore described, having through passages 26 bounded by internal walls 28 as in FIG. 3. The passages each form a respective optical path in which is interposed a seal 36, a mass or body of photo-metachromic material 38, and a mass or body of luminophor material 40. Luminophor material 40 is selected, for example, to provide a luminescence emission in the wavelength range from 300 to 400 m$\mu$ under one excitation condition and a luminescence emission in the wavelength range from 400 to 600 m$\mu$ under a second excitation condition; and in the example the photo-metachromic material is such as to be color-absorptive to provide a blue effect, for example, as viewed through seal 36, when the material 40 is excited by 300–

400 mμ radiation, and to provide a colorless effect, as viewed through seal 36, when material 40 is impinged or irradiated by 400-600 mμ radiation. Since some photo-metachromic materials must be protected from vacuum (low sub-atmospheric pressures), suitable thin seal means may be provided as at 36a in such cases, interposed between the photo-metachromic material and the region of lowered pressure. In the exemplary optical unit construction illustrated in FIG. 2, activating radiation in the form of cathode rays or other radiation may be directed in the direction of arrow A so as to impinge upon and excite luminophor material 40 to provide a luminescence emission of, for example, wavelengths in the 300-400 mμ range. The emission will, at least in part, be transmitted through thin seal 36a (if the latter is provided) and impinge upon photo-metachromic material 38 to turn the latter blue, for example. This color change (from a colorless state) may be sensed by means, such as selective photomultiplier tube means, depicted at 60 in FIG. 6. This stable color-state to which material 38 is changed may be considered as equivalent to storage of a binary "one" bit. At a later time, a different type or wavelength range of radiation may be directed in the direction of arrow A (FIG. 2) to excite material 40 into emission of a different color of light such that this latter light emission will, in impinging upon material 38, return the latter to a colorless state.

Further in connection with the memory system or unit of FIG. 2, it will be evident that a very thin light-reflective coating or deposit of, for example, aluminum, applied on the exposed outer surface of material 40, will enhance reflection of luminescence radiation from material 40 onto material 38. In cases where such efficiency-improving reflector is added, care must be exercised that it be not thick enough to greatly interfere with the beam of luminophor-exciting radiation applied in the direction of arrow A. Luminophor material 40 may comprise two or more different phosphors, for example, each excited by but one of the two kinds or wavelength ranges of excitant radiation mentioned and each when excited producing only its own characteristic luminescence radiation. These phosphors may be selected in accord with the particular photo-metachromic material which must be excited. For example, with one of the blue-yellow sensitive photo-metachromic materials disclosed in co-pending application of Elliot Berman, Serial No. 654,578, filed April 23, 1957, now Patent No. 2,953,454, luminophor material 40 may be composed essentially of a mixture of blue-luminescing phosphor and yellow-luminescing phosphor. The phosphors, and excitants, may be selected from among those cited and explained in pages 152-245 of the text "Luminescence of Solids," hereinbefore cited.

In FIG. 5 there is depicted a fragment of a section of a plate such as plate 24 of FIG. 1, and illustrating a particular form of the invention useful in the study of phosphors which must be protected from lower sub-atmospheric pressures such as are encountered in a vacuum tube, and which phosphors must in the course of study be subjected to radiation which is absorbed or greatly attenuated in air. As depicted, a mass of the phosphor to be investigated, shown at 44, is deposited as an optical element in at least one optical passage 26 formed in plate 24. The phosphor 44 may be protected from air by a gas-tight seal 42 of the type hereinbefore described, and may be protected from lower pressures (vacuum) by a gas-tight seal 46. If the phosphor 44 is to be subjected to cathode ray emission, plate 24 may form a window or face-plate of a CRT, as illustrated by window 22 of FIG. 4, and the electron-beam directed through seal 46 in the direction of arrow A. The latter may be made very thin and electron-permeable for that purpose, since passage 26 is of very small diameter (of the order of one mil diameter). If the phosphor is to be subjected to visible light, infrared or ultraviolet radiation, a mass of a suitable luminophor 48 may be placed in passage 26 in contact with seal 46, and excited to provide the proper waveband of emission for phosphor 44. In the case of ultraviolet irradiation of phosphor 44, seal 46 may in instances be omitted or made extremely thin and of material having good ultraviolet transmitting characteristics; and in such cases an additional seal 50 may be provided, the latter seal being permeable to or transmissive of the radiation used to excite luminophor 48. The optical unit, or units when a multiplicity of passages 26 are employed, have the advantage of providing extremely thin gas-tight seals through which the several types of radiation must pass, the thinness being in part due to the seal or seals being backed up or supported by the luminophor material, and in part due to the very small diameter of the passage. Heretofore the radiation has been required to pass through a solid of thickness of the order of that of plate 24.

In FIG. 6 is somewhat diagrammatically shown a system according to the invention, in which system a source of exciting radiation is represented as embodied in modified CRT 10, and in which the radiation is directed into individual ones of discrete optical systems in a plate-like device 24. The latter device, and the individual optical units therein, may be like or similar to those of which fragments are shown in FIGS. 2, 3, and 5. The luminescence radiation produced by the luminophor material next adjacent the outer face of device 24 caused, for example, by quenching of the material is selectively detected by one or more of photomultiplier tube means 60, 64. The latter means are each equipped with a respective optical filter means 62, 66, whereby only a particular desired wavelength range of emission is effective in any particular one of the emission-detecting tube means. While only two tube means 60, 64 are illustrated, it will be understood that additional detectors may be added if required.

In FIG. 7, a plate-like member 24a, like or similar to plate 24 of FIG. 1, is provided with a multiplicity of optical passageways 26a, only two of which are indicated in the depicted fragment of the member. The individual passageways are bounded or defined by respective smooth cylindrical walls 28a of the characteristics hereinbefore described. Suitably mounted in respective end portions of at least some of optical passageways 26a are end portions of a plurality of optical-fiber devices 82, 83 which may be monofils of drawn quartz or drawn methyl methacrylate, for example. Preferably the monofils are made to closely fit the holes or passageways 26a, and the ends thereof preferably are sealed, each in its respective hole, to form an optical element of a respective optical unit. Disposed at the interior ends of the optical fibers or monofils 82, 83, etc. are respective deposits 80 of optically active material. The latter may be a luminophor, such as the phosphor rhombohedral

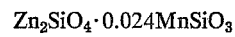

having characteristics detailed on page 225 of the cited text by Levernz. Alternatively, the optically active deposit may consist of or comprise one of the materials listed in the aforementioned co-pending application of Berman, Serial No. 654,578. If necessary or desirable, additional separator or seal means, such as that depicted at 81 in FIG. 7, may be interposed between a monofil and its associated deposit. Such separating means are in instances necessary to prevent poisoning of, for example, a phosphor comprised in a deposit (80, 81) of optically active material, by an organic polymer monofil such as may be used as optical fibers 82, 83. The separator or seal means 81 should, of course, be as thin and as transparent as is practicable.

Continuing reference to FIG. 7, each of the monofils or optical fibers 82, 83, etc. may be terminated at the other end thereof by an optically sensitive detector means such as photoresistor cells 84, 85 whose electrical resistivity is varied in accordance with the intensity of the light (infrared and/or ultraviolet, and visible emission) received through the respective monofils. It will be evident that by this means, individual information bits may be sensed or "read" by the respective optical units, and the individual outputs utilized at respectively different locations as may be desired. It is evident that deposits 80 may be mixtures of phosphors, individual phosphors, or structures including both a phosphor and a photometachromic material sensitive to the luminescence emission from the phosphor.

In FIGS. 8, 9, and 10 are illustrated means useful in applications of the invention in the field of high-density data-storage systems in which the data is stored in relatively permanent form as small color-spots or records in or upon an optical film similar to well-known photographic "color-transparency" films, and in which systems optical means provide for self-clocking of the "read-out" of the stored data. The clock means includes a second patterned "color-transparency" film cooperating with the data-storage film. Both of the films are supplied discrete pulses of light by means such as those hereinbefore described, whereby stored data may be read bit by bit, in serial order or individually as selected.

In FIG. 10 a magnified sectional view of fragments of a face-plate 24b is shown, the face-plate being substantially similar to or like the previously described plate 24. Plate 24b is adapted to form the face plate of a CRT, whereby a focused and controllable beam of electrons (indicated by the arrow at EB) is caused to be "played" or directed across the plate and enter passages 26b in a selected and predetermined order. Each passage 26b forms a respective discrete optical path, and in this example each passage or hole 26b comprises optical-element means 90 which includes gas-tight seal means and luminophor means which are activatable by the electron beam EB to produce light. The produced light includes at least two different and separable bands of the spectrum. The seal means may be on either or both faces of the luminophor means, and may be of the types previously described. The luminophor means comprises one or more phosphors adapted to produce strong emissions in the two different separable bands of the spectrum, or alternatively, may produce a strong emission of white light; and the luminophor means is so selected. In explaining the functional operation of the data-storage system, the colors blue and red will be used as exemplary, although other divisible portions of the spectrum may be used. In the example, then, phosphor means in means 90 will, upon excitation by electron beam EB, emit blue and red light.

Disposed substantially in contact with face-plate 24b is a set of color-transparency films 91, 92. Film 91, which serves a clock-signal-producing function, may contact the outer surface of plate 24b as indicated, with film 92 disposed in contact with film 91. As indicated in FIG. 8, film 91 is provided with alternating areal extents (stripes) which have differing light-transmitting characteristics. The areas may be alternating stripes of red-opaque and red-transmissive character, all of the stripes being blue-transmissive (BT). The red-opaque portions are denoted or designated by the letters RO, and the red-transmissive portions by the letters RT. The stripes are so produced that when the film is properly affixed to face-plate 24b, alternate ones of passages 26b in a given row thereof will be covered or overlaid by RT stripes, while the intervening passages will be covered by RO stripes; and film 91 is so positioned and affixed to plate 24b. Thus both red and blue light from the phosphors in alternate ones of passages 26b (transversely of the rows) will be transmitted through film 91, while only blue light from the phosphors in the intervening ones of the passages will be transmitted through the film.

Film 92 is red-transmissive (RT) over its entire extent, but as indicated in FIG. 9 is provided with an array of portions or areas which are BO (blue-opaque or non-transmissive of blue light), with the remaining portions or areas blue-transmissive (BT). The portions are so made and distributed that the array is complementary with the array of optical units and passages 26b of plate 24b, whereby each significant portion of film 92 overlies a respective one of the optical units or passages. The disposition of the BT and BO portions or areas of film 92 is such that, for example, BT areas represent respective binary "ones" of recorded data, the BO areas then representing respective binary zeros; and the data is recorded so as to be properly disposed for serial reading by controlled "scanning" of passages 26a by the electron beam. It will be understood that film 92 may be quickly replaced by any of other similarly made films containing other arrays of BT and BO areas representing respective other groups of data.

As indicated in FIG. 10, as electron beam EB progresses in scanning movement, as from left to right in the figure, it is evident that discrete light "pulses" or beams, spaced apart serially in time, will be produced, each in a respective optical unit such as that indicated by letter m. The light pulses are also spatially separated and distinct, and accordingly are discrete with respect to space as well as with respect to time, and hence may be characterized by the terms "space-discrete" and "time-discrete." Considering the scanning of electron beam EB, and commencing at the left and progressing toward the right in FIG. 10, it is evident that red-sensitive photodetector means 96 (which is arranged to receive light from all of face-plate 24b) will receive a discrete pulse of red light transmitted from the first unit (m) through an RT area of film 91 and red-transmissive film 92; and that blue-sensitive photodetector means 97 will receive a discrete pulse of blue light transmitted from the unit (m) through blue-transmissive film 91 and a BT area of film 92. Thus each of the indicated detector means will provide a respective positive output, which may in either case indicate a binary "one." The light-pulse inputs to the respective detecting means 96, 97 are transduced into electric-pulse signals which are in turn amplified and shaped by amplifying and wave-shaping means of known type and diagrammatically indicated in FIG. 10. The clock signal output of clock wave-shaper CWS is as indicated by the depicted waveform, and is employed as indicated to properly demark or "time" the data signal passing through data waveshaper DWS. The data-signal output, indicated by its waveform diagram, may be suitably reformed for use in a computer.

A very short interval after optical unit m has been made active, electron beam EB activates the phosphor means of the next optical unit, n. The pulse of red light from unit n is absorbed by the overlying RO stripe of film 91, hence a "zero" clock signal is produced by red-detector means 96. At the same time the pulse of blue light from unit n passes through BT film 91 and through a BT area of film 92, and is detected by blue-detector means 97; and the latter produces a binary "1" output signal. Thus it is evident that as the electron beam impinges serially on the phosphor means in a row of optical units such as m, n, ... y, z, the red-detector means 96 will provide "0" and "1" clock output signals in alternation, irrespective of the arrangement of data-representing arrays of BT areas in film 92. Also it is evident that a data-representing signal of the non-return-to-zero type, represented by the waveform labelled "Data Signal" in FIG. 10, is concurrently produced synchronously with the clock signals. It is evident that the clock signal thus produced may be used to separate the individual bits of the data-representing signal wave, using well-understood electronic-computer techniques.

Indicated below the films 91, 92 are the binary designations of the data (blue) and clock (red) light-pulse signals passed out of the films and serially detected by the respective detector means. As indicated, the data signal represented is read as: 111010001011; and the clock signal is read as: 101010101010. The diagrammatic representation of the film 92 in FIG. 10 indicates the data-configuration comprised in only small segments of a single line or row of areas of the film 92, whereas in FIG. 9 there is an indication of the data-configuration in small segments of each of a plurality of rows of areas, the hatched areas representing BO areas of the film corresponding to binary zeros. Small dash-circles within respective square areas, in FIGS. 8 and 9, represent the effectively illuminated areas of the respective films when the corresponding optical units are activated by the electron beam. It will be understood that each square area of film 92, as depicted in FIG. 9, will overlay a respective optical unit of plate 24b.

While in the preceding description of plate 24b and films 91, 92 the electron beam EB has been considered to impinge upon the optical units one at a time, it is to be understood that the described arrangement and operation is exemplary only, since the beam could as well scan successive groups of the optical units, each group being overlaid by a respective single bit-representing area of film 92.

The advantage of a digital-data-storage system as described is that a very large number of information bits can be stored in a relatively small area of a plate such as plate 24 or 24b, and that access to a particular bit may be gained in a very short interval of time through the ability of the CRT to direct electron beam EB onto a particular unit within a very brief time period.

Each or any of the described optical units may in instances be improved by utilization of an opaque material for plate 24 (or 24a or 24b) and/or by employment of a thin light-reflective film deposited upon walls 28 or 28b. Both of these factors may markedly contribute to reduction of interference effects between an optical unit and any of the adjacent units. The provision of a multiplicity of very small discrete optical systems in a small space permits construction of a compact high-density digital memory, and in conjunction with a controllable cathode ray beam within an evacuated envelope, permits extremely rapid access to any portion or unit of the memory. Due to the extreme thinness of the gas-tight seal means in the respective optical passages, relative to the thickness of plate 24, ray or beam transmission losses are very materially reduced. Thus a relatively large face-plate having the requisite mechanical strength to withstand full atmospheric pressure may be used, while permitting very efficient transmission of radiation which would otherwise be considerably attenuated by the full thickness of plate 24.

From the foregoing explanation of the invention and the description of a preferred physical embodiment thereof it is evident that modifications and changes therein will occur to those skilled in the art; and it is accordingly not desired to limit the invention to specific details of the described exemplary embodiment but only as indicated by the scope of the following claims.

What is claimed is:

1. A device providing a multiplicity of closely-disposed discrete optical units, comprising: a plate-like body having a multiplicity of internal walls each defining a respective individual open optical passageway straight through the said body from face to face thereof, the passageways being in general of substantially uniform cross-section throughout and said walls being smooth to provide optically reflective surfaces; and a plurality of optical means each disposed within a respective one of said passageways and each acting to seal the respective passageway against flow therethrough of gas, whereby said body and the said plurality of optical means provide a multiplicity of closely-disposed optical units.

2. A device according to claim 1, in which said plurality of optical means each comprise radiation-alterable means having bistable optical operating characteristics, said radiation-alterable means being positioned to intercept incoming exciting radiation; and means for supplying radiation to at least one of said radiation-alterable means to alter the optical state thereof.

3. A device according to claim 1, in which at least some of said optical means comprise luminophor means excitable to two different luminescence-emission states by respectively different excitation-radiations, said luminophor means being situated in respective optical passageways for interception of exciting radiation entering the passageways, and each said optical means comprising means to seal the luminophor from contamination by foreign substance.

4. A device according to claim 1, at least some of said optical means each comprising a luminophor adapted to be excited to luminescence by impinging radiation, and each comprising a body of photo-metachromic material sensitive to the luminescence radiation from the luminophor incident to excitation of the latter; and means to supply impinging radiation to said luminophor.

5. An optical device for digital-data-storage functions, comprising, in combination: a plate-like substantially rigid opaque body having first and second opposite faces and a multiplicity of generally cylindrical wall surfaces each extending from face to face through the body; a plurality of optical means each situated in a respective one of said passageways and each comprising a body of luminophor material and each comprising a body of photo-metachromic material sensitive to luminescence-radiation from the respective body of luminophor material; and means for supplying exciting radiation to at least selected ones of said bodies of luminophor material to excite the latter to luminescence to cause change of state of the respective bodies of photo-metachromic material.

6. A device according to claim 5 in which said luminophor material is differentially excitable to two different luminescence-emission states by respectively different excitation-radiations, and in which said photo-metachromic material is differentially sensitive to the different luminescence emissions produced by said luminophor material, and in which said means for supplying exciting radiation includes means for supplying the said two different excitation-radiations.

7. A device according to claim 5, in which said luminophor material is differentially excitable to two different luminescence-emission states by respectively different excitation-radiations, and in which said photo-metachromic material is differentially sensitive to the different luminescence emissions produced by said luminophor material, and in which said means for supplying exciting radiation includes means for supplying the said two different excitation-radiations; and optical detector means capable of selectively detecting a change of state of said photo-metachromic material.

8. A high-density digital-data-storage system comprising: a first thin sheet-like member transmissive of a first wavelength-band of radiation, and having spaced-apart areal portions transmissive of a second wavelength-band of radiation and intervening areal portions opaque to said second wavelength-band of radiation; a second thin sheet-like member disposed face to face with said first thin sheet-like member, said second member being transmissive of said second wavelength-band of radiation and having a first array of areal portions among a second array of areal portions comprising the remainder of said second member, one of said first and second arrays of areal portions being transmissive of said first wavelength-band of radiation and the other of said first and second arrays of areal portions being opaque to said first wavelength-band of radiation, and said areal portions of said second member being individually dimensionally compatible with and complementary with a respective areal portion of said first member; means for controllably subjecting any individual areal portion of said first member with a respective discrete pulse of radiation containing at least both said first and second wavelength-bands of radiation; and means for selectively detecting and utilizing each wavelength-band portion of any pulse of radiation transmitted through both of said first and second members.

9. Means useful in the study of optical and luminescence-excitation characteristics of luminophors and especially of those luminophors susceptible to degradation in vacuo or in adverse gaseous environment, said means comprising: a rigid plate-like member having two opposite faces and a plurality of internal walls forming open passages through the member from face to face thereof; a plurality of optical units each disposed within a respective one of said passages and each of said units comprising a mass of luminophor material and gas-tight sealing means sealing the mass of luminophor material in the respective passage and sealing the respective passage against flow of gas therethrough, whereby said plate-like member may form a wall of an evacuable envelope for excitation of the said luminophor material by radiation transiting in vacuo.

10. Means according to claim 9, said walls being of generally cylindrical form of uniform cross-section and being optically smooth and reflective and formed of optically opaque material; and said luminophor material comprising two bodies of respectively different luminophors, a first luminophor being adapted for excitation by externally supplied radiation arriving through said sealing means, and the second luminophor being adapted for excitation by radiation from the first luminophor.

References Cited in the file of this patent

UNITED STATES PATENTS

| | | |
|---|---|---|
| 2,001,672 | Carpenter | Mar. 14, 1935 |
| 2,480,113 | Betzler | Aug. 30, 1949 |
| 2,773,992 | Ullery | Dec. 11, 1956 |
| 2,777,040 | Kazan | Jan. 8, 1957 |
| 2,805,360 | McNaney | Sept. 3, 1957 |
| 2,900,523 | Ruzicka | Aug. 18, 1959 |
| 2,907,886 | Willard et al. | Oct. 6, 1959 |

OTHER REFERENCES

Keller: IBM Technical Disclosure Bulletin; vol. 1, No. 1, June 1958, page 38.